Patented Dec. 28, 1926.

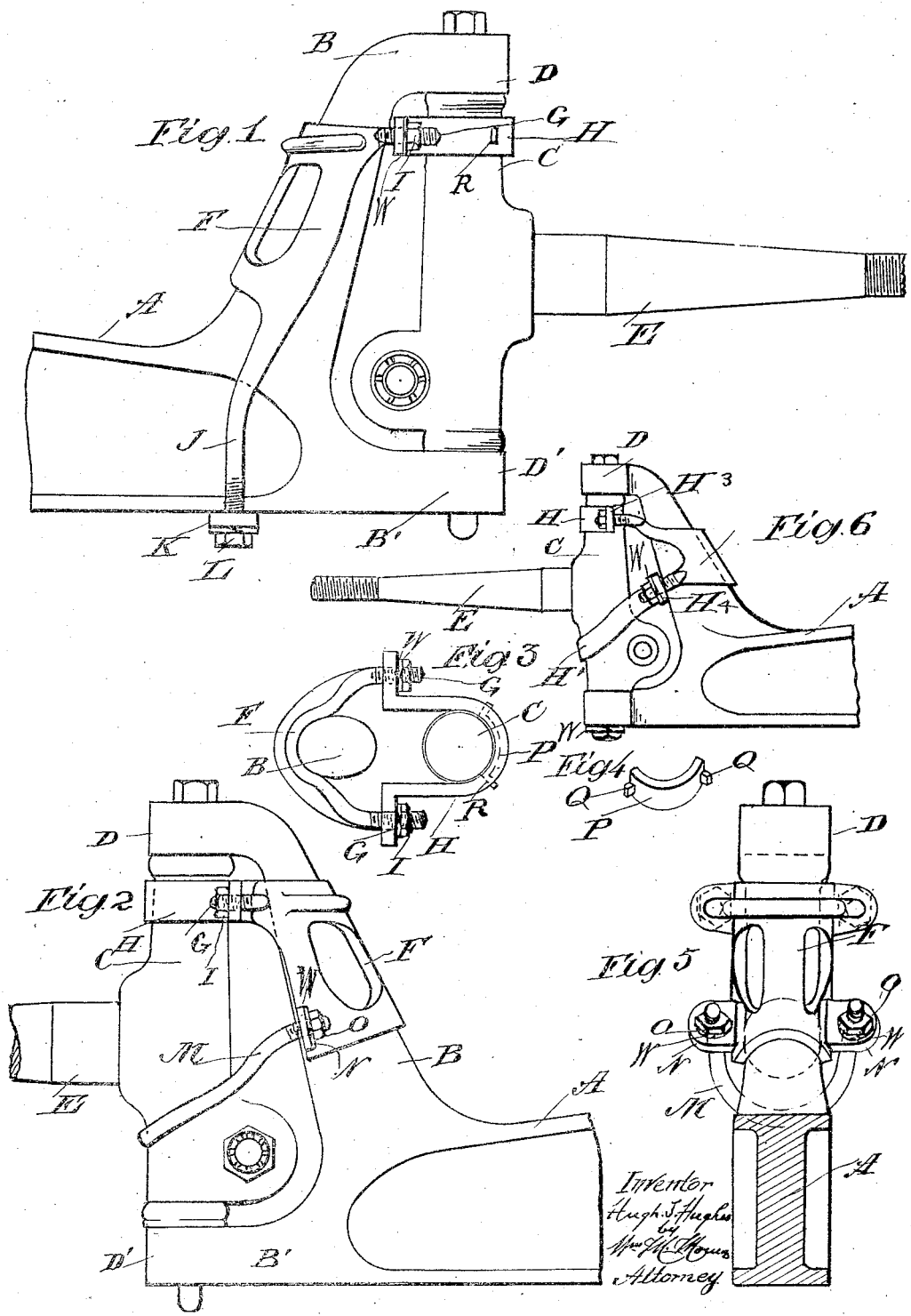

1,612,725

UNITED STATES PATENT OFFICE.

HUGH T. HUGHES, OF CLEVELAND, OHIO.

REENFORCING MEANS FOR SPINDLE BOLTS.

Application filed April 28, 1926. Serial No. 105,203.

The objects of the invention are to provide adjustable straining means for taking up the wear in the associated parts of the steering knuckle or pivoted joint at the forked ends of the axle of a Ford or other car, in such a manner that they will not rattle as they become worn.

In this manner all loose motion of the pintle in its fork bearings will be eliminated and the parts can be maintained in perfect alignment with each other.

The device includes a saddle member adapted to be mounted upon the upper side of the fork, in each extremity of the axle, and also includes securing means therefor and means for adjustably connecting the said saddle with the pintle rod, which serves also as straining means to take up all loose wear between the bearings in the fork and the pintle rod.

The invention is hereinafter described, illustrated in the accompanying drawings, and specifically pointed out in the claims.

In the accompanying drawings Fig. 1 is a side elevation of one end of a Ford axle showing one method of applying the device.

Fig. 2 is a similar view of a device having connecting means positioned both above and below the wheel spindle and adapted to act equally upon the upper and lower bearings and equalize the strain thereon.

Fig. 3 is a transverse section of the device taken on line 1—1, Fig. 1.

Fig. 4 is a perspective of the bushing employed to complete the connection.

Fig. 5 is a transverse section of the axle showing the inner side of the device shown in Fig. 2.

Fig. 6 is a side elevation of a modified form.

In these views, A represents the axle, B, B' are the upper and lower arms of the terminal fork; C is the vertical pintle mounted in bearings D, D, in the fork extremities; E is the wheel spindle.

F is a saddle applied to the back of the upper arm of the fork and closely fitted thereto;

In Fig. 1 this saddle is provided with horizontal arms G, G, which are screw threaded at their extremities and pass through the clamping plate or clevis H which embraces the outer side of the pintle, and is adjustably pressed closely thereupon to take up loose motion by means of nuts I, I. Also the lower part of the saddle is provided with extended integral arms J, J, the extremities of which are screw threaded and pass through a clamping plate K passed underneath the axle and through adjusting nuts L, L, thus holding the saddle rigidly in place.

In Figs. 2 and 5 in lieu of the integral arms J, J, a clamping loop or strap M is shown which passes around the pintle underneath the spindle E and its extremities pass through ears N, N, on the sides of the saddle and are screw threaded and secured by means of nuts O, O, thus making adjustment possible both above and below the spindle, so that loose motion may be eliminated from both bearings and the parts will always be in true alignment with each other.

At P is shown a bronze bushing, the ends of which may be turned outwardly at Q and inserted in openings R in the clamping sleeve, or graphite may be placed in the opening made to receive the bushing.

W W are spring washers without which the device will not operate successfully.

In the modification shown in Fig. 6, upper and lower curved plates or clevises H and H' are employed having ears $H^2$ and $H^3$ respectively through which screw threaded ends of the saddle pass.

The device heretofore described serves the double function of a brace, first to prevent the ends of the fork on the axle from spreading, and second, to draw the spindle toward the fork. The saddle portion F of the brace rests upon the inclined side of the fork and by drawing upon the lower end thereof by means of the nuts K the entire brace including the clevis portion H can be tightened upon the fork and spindle.

Also by adjusting the nuts L upon the screws G of the clevis the same thing can be accomplished.

Having described the invention, what I claim as new and desire to secure by Letters Patent is:

1. In a device of the class described, the combination with the forked end of an axle, one of the sides of said fork being inclined, and a pintle rod pivoted in said forks, of a clamping plate slidably mounted upon said inclined side of said fork, and means for adjustably connecting said clamping plate with said pintle.

2. In a device of the class described, the combination with the forked end of an axle, one of the sides of said fork being inclined, and a pintle rod pivoted in said forks, of a saddle member slidably mounted upon said inclined side of said fork, and means for adjustably connecting said saddle member with said pintle, and separate means for adjustably connecting said clamping plate with the lower side of said axle.

In testimony whereof I hereunto affix my signature this 5" day of April, 1926.

HUGH T. HUGHES.